Aug. 9, 1960 G. A. M. PETERSEN 2,948,483
CABLE STRINGING APPARATUS
Filed Dec. 31, 1954 3 Sheets-Sheet 3
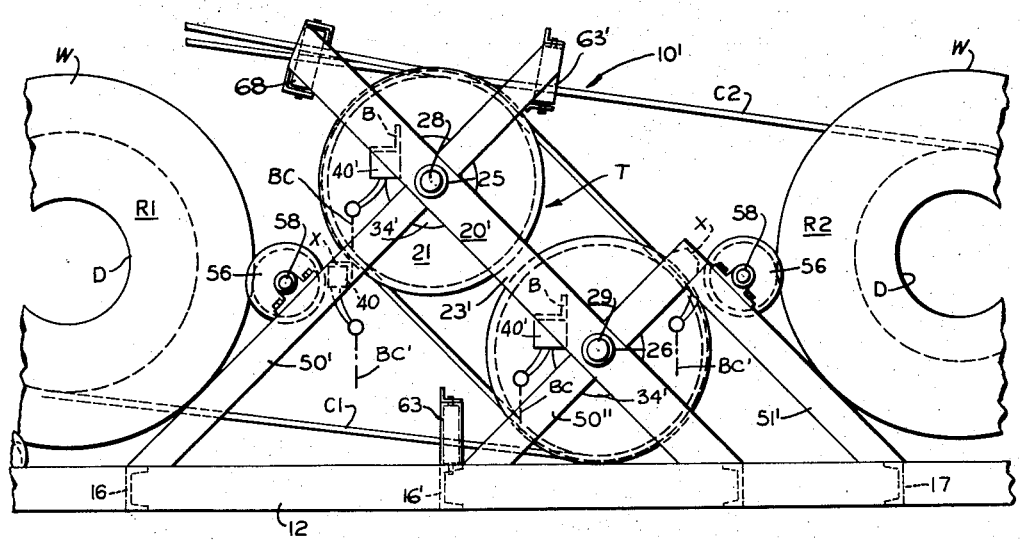
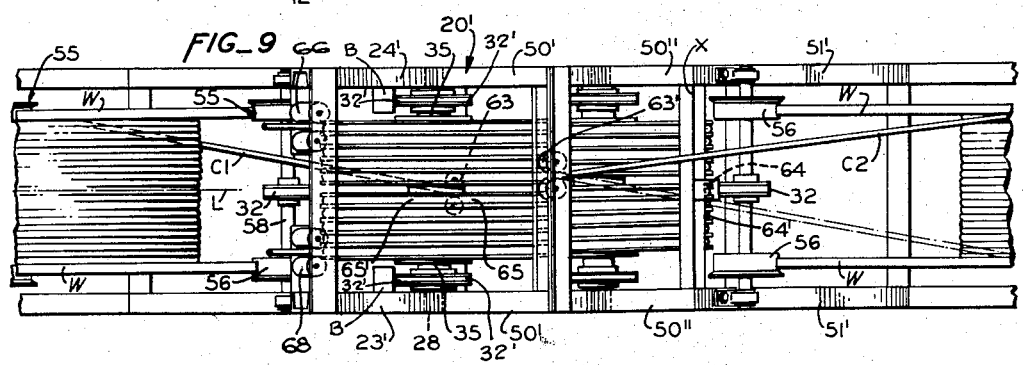
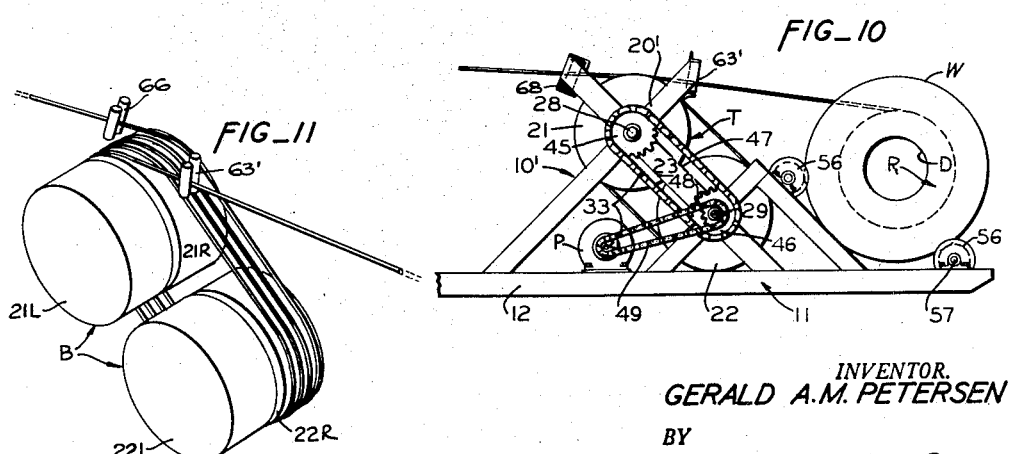
INVENTOR.
GERALD A.M. PETERSEN
BY
Hansen and Lane
ATTORNEYS

United States Patent Office 2,948,483
Patented Aug. 9, 1960

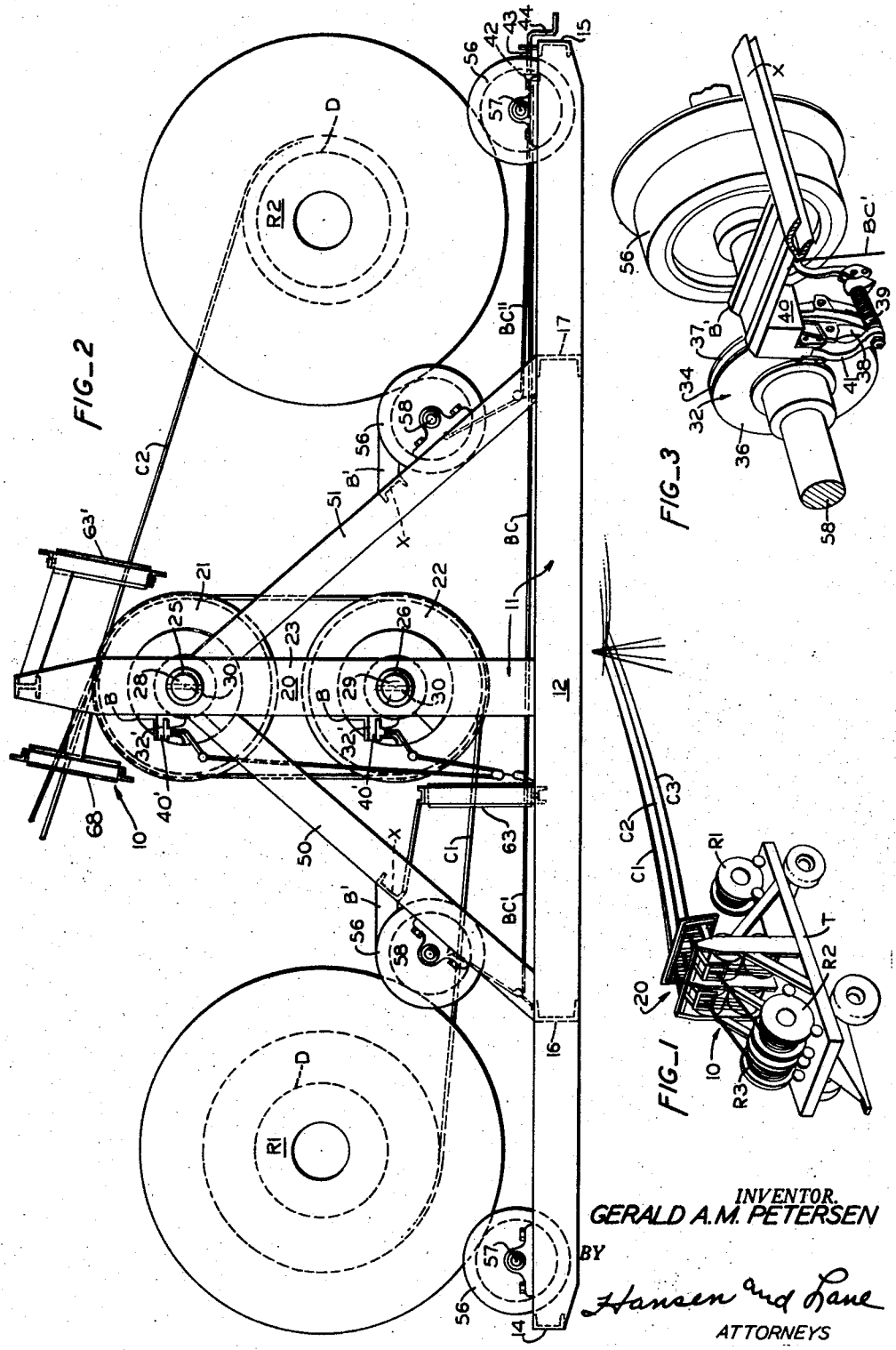

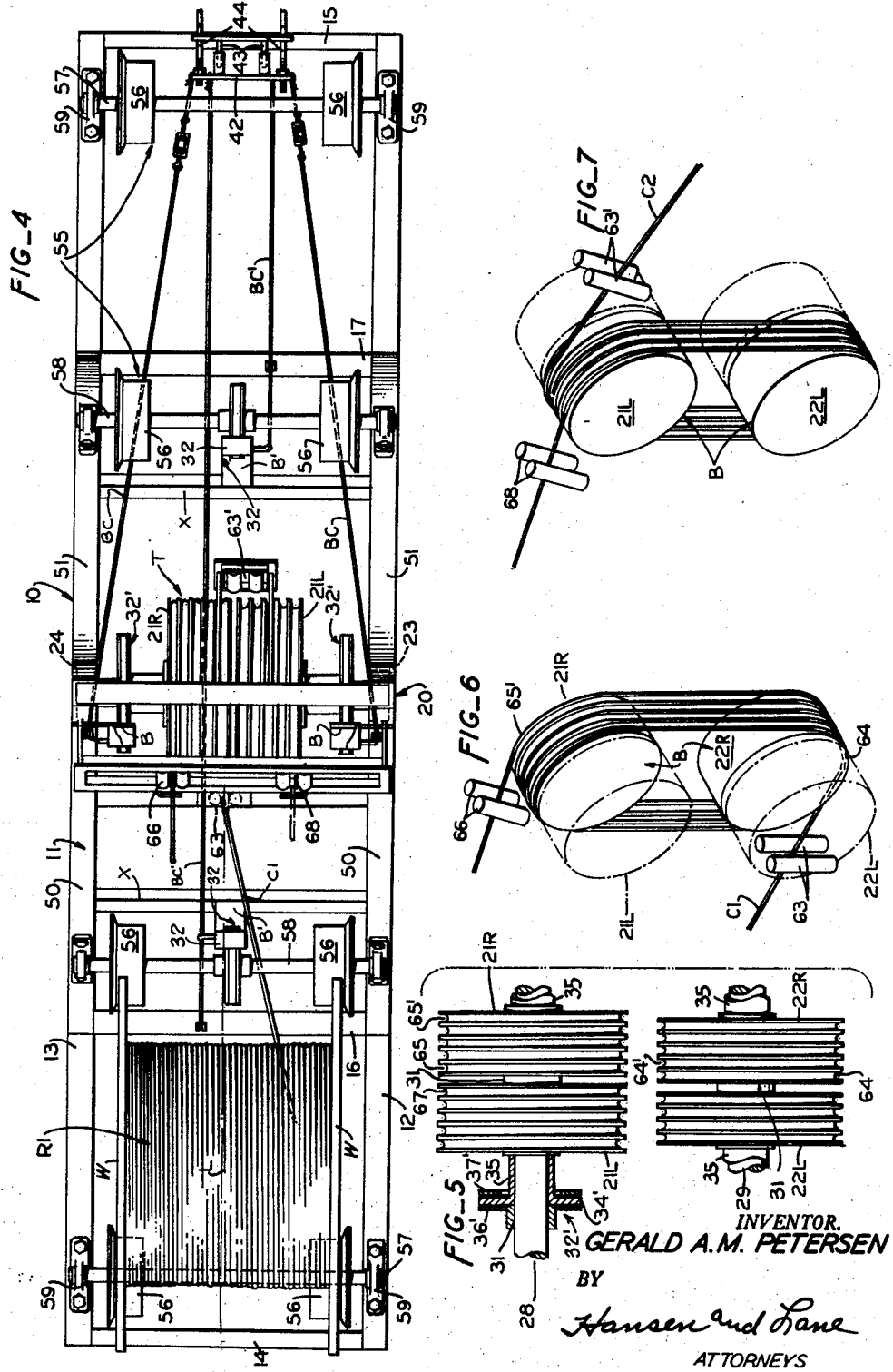

2,948,483

CABLE STRINGING APPARATUS

Gerald A. M. Petersen, 460 Kifer Road,
Santa Clara, Calif.

Filed Dec. 31, 1954, Ser. No. 479,041

9 Claims. (Cl. 242—54)

This invention relates to apparatus for paying out or winding in transmission cable or wire relative to transmission towers or poles upon which such wire or cable is to be or has been suspended and supported.

The invention is particularly directed to a novel apparatus for supporting a plurality of reels for turning relative to a tensioning device by which the wire or cable is stabilized during winding in or paying out of cable relative to such reels. Since the introduction of wire or cable of the type having a steel core covered by spiralled strands of aluminum wire, great difficulty has been encountered in the handling of this type of conductor in a manner to avoid damaging the aluminum outer wires or covering.

These aluminum transmission conductors usually have a diameter of from .75 inch to 1.75 inches and therefore present considerable outer surface. Any appreciable scratching, marring or undue abrasion of the surface of these aluminum cables will cause corona loss resulting in interference to communication systems such as radio. Consequently if such corona loss is to be kept within tolerable limits it is of the utmost importance that these aluminum cables be handled with meticulous care.

The problem is the same whether the wire is being strung out to the power poles or taken down from the same. In other words, when cables having a greater capacity are to be strung in place of the ones of lesser size it is just as important that the incoming cables be handled with care to prevent surface abrasions so that it can be reclaimed and used again on other installations with a minimum of corona loss.

The apparatus of the present invention has as one object the provision of a transportable unit for rotatably supporting reels of this aluminum cable in proximity to a tensioning device so that there will be no drag or sagging of the cable between the reels and tensioning device.

Another object is to provide an apparatus in which a minimum of slippage occurs between the cable and the apparatus. In this connection it is a further object to provide an apparatus in which the reels are rotatably supported at a minimum distance from the tensioning device yet far enough therefrom to avoid scratching of the surface of the cable whether coming into the reel or paying out therefrom relative to the tensioning device.

It is a further object of this invention to provide a tensioning device in the form of a plurality of bull wheels provided with sheaves arranged to receive several windings of the cable in spiral fashion to obtain a maximum of surface contact with a minimum of relative movement between the cable and the sheave surfaces.

Another object is to provide the bull wheels of the tensioning device above mentioned with a controlled drag or braking action. In connection with this object is a further object to provide a cradle mounting for the cable supporting reels coordinated with the controlled drag or braking action for maintaining the cable in a tautened condition between the reel and bull wheels of the tensioning device.

It is yet another object to provide an apparatus in which the reel support and tensioning device are correlated for joint action during the paying out or the winding in of the cable.

These and other objects and advantages of the present invention will become more apparent from a reading of the following description when taken in the light of the drawings in which:

Fig. 1 is a perspective view of a trailer supporting apparatus embodying the present invention.

Fig. 2 is a side elevational view of the reel support and wire tensioner of the present invention.

Fig. 3 is a perspective view of a brake mechanism employed in conjunction with the present invention.

Fig. 4 is a plan view of one unit shown in Fig. 2.

Fig. 5 is a vertical elevation of a portion of the tensioning device of Fig. 2.

Fig. 6 is a perspective flow diagram of a cable over a part of the tensioning device illustrated in Figs. 1, 2, 4 and 5.

Fig. 7 is a perspective flow diagram of another cable around another part of the tensioning device illustrated in Figs. 1, 2, 4, 5 and 6.

Fig. 8 is a fragmentary side view similar to Fig. 2 but showing a modification in construction relative thereto.

Fig. 9 is a plan view of Fig. 8.

Fig. 10 is a partial elevation similar to Fig. 8 but at reduced scale and showing a powered tensioning device.

Fig. 11 is a flow diagram of a cable over the tensioning device as arranged in Figs. 8 through 10.

The apparatus of the present invention is generally designated 10 in Figs. 1, 2 and 4 and 10' in the modified structure depicted in Figs. 8, 9 and 10. In either case the apparatus is adapted to be mounted on a trailer T for transport over rough terrain across which transmission lines are to be strung. As is customary at least three such cables C1, C2 and C3 are strung between transmission towers and poles. The present invention contemplates the provision of an apparatus for supporting at least three reels R either bearing one such cable or adapted to receive one such cable during removal thereof from a transmission line.

It will be appreciated that each such reel may have a capacity of receiving from four to five thousand feet of such cable and the average span length between transmission poles or towers is about 1150 feet. Therefore it is very important, as the several cables are being strung or taken in, that the cables do not touch the ground or drag over the ground so as to avoid marring or scratching of the cable. In practice it is the custom to string one towing cable for each cable to be pulled over wooden rollers secured to the cross arms of the transmission poles or towers. One end of such towing cable is either secured to a power winch or to a tractor while the opposite end of the towing cable is connected to one end of the cable C1, C2 or C3 by what is known to the trade as a "come along." Thus the several cables C1, C2 and C3 can be pulled from their respective reels R and strung between the cross arms of three or four transmission poles or towers during each setting of the apparatus embodying the present invention. The same is true when the cable is being reclaimed, i.e., taken in, and rewound on reels for use elsewhere. With apparatus such as contemplated by this invention, while one unit is set up for stringing of cable to or from one group of say four transmission poles, another such unit can be readied along the line four poles ahead so that no delay occurs by reason of the linemen having to wait for more cable on site.

The apparatus 10 and 10' of the present invention is similar in construction in that each includes a framework 11 comprising side channels 12—13 secured in parallel spaced relation by fore and aft cross channels 14—15 and intermediate cross channels 16—17 at substantially quarter points inwardly from the end channels.

Each apparatus 10 and 10' includes a trunnion tower substantially midway the fore and aft ends of the framework 11, the preferred form in Figs. 1, 2 and 4 having a vertical tower 20 while the form shown in Figs. 8, 9 and 10 has a tower 20' which leans forwardly, i.e., in the direction in which the cable is to be strung or taken in. Since each of the forms shown are substantially similar in construction, like reference numerals will indicate like parts thereof, prime numerals being used only when necessary to distinguish differing parts from each other.

In either form (Figs. 1, 2–4 or Figs. 8, 9–10) the framework 11 is disposed to be secured to the flat bed of a trailer T such as the one shown in Figure 1. The normal proportions of each framework 11 is such that two units 10 or 10' can be secured side by side on the flat bed of the trailer T. Moreover, each unit 10 or 10' is so designed that it can support two reels R, one adjacent its fore end and another adjacent its aft end, or one reel forwardly of the trunnion tower 20 or 20' and one reel to the rear of such tower. It will therefore be apparent that each apparatus 10 or 10' is capable of supporting at least three reels R1, R2 and R3 to or from which the cables C1, C2 and C3, respectively, extend.

The trunnion tower 20 or 20' of each unit 10 or 10' serves as a support for a tensioning device B comprising a pair of upper and lower bull wheels 21 and 22, respectively. In this connection the trunnion tower 20 includes a pair of vertically disposed main channels 23—24 having their lower ends secured to the side channels 12 and 13, respectively, while the tower 20' includes similar channels 23'—24' disposed at an angle diagonally and forwardly relative to the framework 11 to which it is attached.

Each main channel 23—24 and 23'—24' supports a pair of bearings 25—26 spaced from each other sufficiently lengthwise of these main channels to allow for necessary clearance between the peripheries of the upper and lower bull wheels 21 and 22. The diameter of these bull wheels is determined by the minimum permissible bending radius of the cable C to be strung around them. The diameter of the bull wheels is therefore preferably comparable to the diameter of the drum D of the reel R upon which the cable is wound. The bearings 25—25 and 26—26 on opposite main channels 23—24 each receive and support the ends of cross shafts 28—29, respectively.

The shafts 28 and 29 are secured by a pin 30 to the respective bearings 25—26 so that the shafts 28—29 do not turn but are stationary. The shaft 28 supports the upper bull wheels 21 while the shaft 29 supports the lower bull wheels 22 for rotation. The bull wheels 21 and 22 consist of right and left sections designated 21R and 21L as well as 22R and 22L when necessary for purposes of clarity in this description. Suffice it to say that the right hand sections 21R and 22R (Fig. 6) are for receiving the cable C1 extending to or from the forward reel R1 and the left hand sections 21L and 22L (Figs. 7 and 11) are for receiving the cable C2 relative to the aftmost reel R2. This will be explained more fully later in connection with the operation of the apparatus.

The bull wheels 21—22 R and L are suitably positioned relative to each other along the length of their respective supporting shafts 28 and 29 by collars or thrust bearings 31 as seen in Fig. 5. Each bull wheel is provided with a drag or cable tensioning media, either in the form of a brake mechanism 32 (Fig. 3) or by means of a direct drive 33 between the several bull wheels and a source of power P (Fig. 10).

In this manner the bull wheels are either restrained against turning or will turn only at such speed as is permitted due to the drag imparted by the direct drive 33 under the control of the source of power P.

The brake mechanism may be of any well known design. In the present disclosure a brake mechanism as shown, described and claimed in U.S. Letters Patent No. 2,375,152 to Turner is employed. In the present disclosure such brake mechanism is employed in two different phases, one as at 32 in connection with the reel supports R (Fig. 3) and the other 32' in connection with the bull wheels (Fig. 5). In the latter case the brake mechanism 32' comprises a disc 34' operatively connected with each bull wheel by means of a flanged sleeve 35 journaled on the cross shaft (28 or 29) and having its opposite end secured to the particular bull wheel with which it is associated (see for example Fig. 5 in which the sleeve 35 is formed integrally with and as a part of the bull wheel). The brake 32' further includes a pair of ring-like shoes 36—37 each circumscribing the particular cross shaft (but not touching the same) on either side of the disc 34. These shoes 36—37, as shown in Fig. 3, are joined for united movement toward or from the disc by a pair of coacting lever arm 38—39 having their upper ends arranged within a control chamber 40 for concerted movement toward and from each other upon operation of a manually controlled lever 41.

In the case of the brake mechanism 32' for the bull wheels the control chamber 40' by which lever arms 38—39 as well as the shoes 36'—37' are supported is suitably anchored to the framework 11 on structural brackets B or appendages thereof welded or secured to the framework in any well known manner. The arrangement is such that the controlled lever 41 is spring urged into ineffective position, i.e., to release the shoes 36'—37' from frictional engagement with the sides of the disc 34'. Thus the disc 34' and bull wheel associated therewith is free to turn upon its cross shaft (28 or 29). However, upon manual operation of the controlled lever 41 the lever arms 38—39 are rocked to urge the shoes 36'—37' into embracing relation with respect to the disc 34' thus restraining the latter as well as the bull wheel against turning.

In other words, the disc 34' is in a sense squeezed between the two shoes 36'—37' and the amount of frictional pressure between the flat surfaces of the shoes is in direct proportion to the amount of pull exerted on the controlled lever 41 by the person operating the same. Each of the four controlled levers 41, one for each bull wheel 21—22R and L, is connected by a brake cable BC having its opposite end secured to a shiftable plate 42 (Figs. 2 and 4) guided for sliding movement relative to fixed guides 43 secured to the framework 11. The shiftable plate 42 may be moved to and fro relative to the fixed guides 43 in any suitable manner, for example by a screw 44 which is crank operated.

In the case of the drag afforded by the direct drive 33 and source of power P it will be noted that the principle is the same excepting that the bull wheels are positively turned at a predetermined speed. In this connection (Fig. 10), the upper and lower bull wheels 21—22 are directly connected to their respective shafts 28 and 29 for turning therewith, these shafts being free to turn relative to their supporting bearings 25—26. These shafts 28—29 each have a sprocket 45—46 secured thereto and a chain 47 is trained around these sprockets so that the two shafts turn in unison and unidirectionally. If desired this may be accomplished by bull gears instead of sprockets and the use of an intermediate gear in mesh with and between the two bull gears. In either case the lower cross shaft 29 has a sprocket 48 secured thereto connected by a chain 49 to a drive sprocket provided on a speed reduction unit connected to the drive shaft of a self contained source of power P which is mounted on the framework 11. Thus by regulating the speed of the source of power P the bull wheels 21—22 will turn at a desired rate.

Referring now to the mounting of the reels R on the framework 11 it will be noted that either trunnion tower 20 or 20′ includes diagonal bracing. As seen in Fig. 2, each vertical main channel 23 or 24 is braced on either side of the framework 11 by fore and aft diagonal braces 50 and 51. The upper ends of these braces are secured to the main channel 23 and/or 24 adjacent the bearing 25—25 for the uppermost cross shaft 28 while the lower end of each brace is secured to the side channel 12 or 13 at its point of connection to the intermediate cross channel 16 or 17 respectively.

In the case of the trunnion tower 20′ the arrangement is somewhat the same except that one diagonal brace 50′ is provided between the upper cross shaft 28 and the foremost intermediate cross channel 16 and another diagonal brace 50″ is provided between the lowermost cross shaft 29 and a medial cross channel 16′. In addition to the foregoing the tower 20′ also includes a rearmost diagonal brace 51′ having its lower end secured to the side channel 12 or 13 at its point of connection to the intermediate cross channel 17, the upper end of this brace 51′ being secured to the upper end of the diagonal brace 50″ which extends beyond the diagonally disposed main channel 23′—24′ as the case may be.

The foregoing arrangement of either trunnion tower 20 or 20′ forms a part of the reel supports 55 on each unit 10 or 10′, these reel supports in either case consisting of a cradle type support now to be described. Referring first to Figs. 2 and 4 each reel support 55 comprises four flat preferably rubber covered flanged wheels 56, two of which are secured to a forward shaft 57 and the other two being secured to a rearward shaft 58. The forward shaft 57 has its ends suitably journaled in bearing bosses 59 secured to the top flange of the side channels 12 and 13 and the rearward shaft 58 likewise has its ends journaled in bearing bosses 60 secured to the forward diagonal braces 50 in the case of the vertical tower 20 or diagonal braces 50′ in the case of the forwardly leaning tower 20′.

Thus the four flanged wheels 56 are arranged two fore and two aft in alignment with each other and in spaced relation to receive and support the circular end members of the reel R in cradle fashion.

As depicted in Figs. 2 and 4 a relatively large reel is shown in the cradle support 55. Should the diameter of the end walls W of the reel be less than as shown, the bearing bosses 59 for the shaft 57 are adjustable along the length of the side channels 12 and 13 for the purpose of shortening the distance between the flanged wheels 56 on the two shafts 57 and 58. In any case each reel R is safely supported by one of these cradle mountings 55. Moreover, each reel is free to turn relative to the cradle support by reason of the journal mounting of the respective flanged wheels 56.

Since there is danger of marring or scratching the cable C where it extends between the bull wheels and the reel R it will be seen that any over-riding of the reels on their rollable cradle mounts should be avoided. To this end the freedom of rollability of the reels upon the flanged wheels 56 is controlled in much the same fashion as are the bull wheels 21 and 22. It is contemplated by this invention that the control over the rollability of the reels be directly related to the drag or braking action on the tensioning device.

The means of affording the foregoing control of both reel and bull wheel comprises a drag in the form of a braking mechanism associated with one set of the flanged wheels 56. The brake mechanism is of the same type as the one 32 already described (Fig. 3) the disc 34 in this case being secured to the shaft 58 which is adjacent the trunnion tower 20—20′. The control chamber 40 of the brake mechanism 32 associated with the reel carrier is mounted on a bracket B′ extending from a cross channel X having its ends welded to the fore or aft diagonal brace 50 or 51, as the case may be. The arrangement is the same in that the controlled lever 41 is connected by brake cable BC′ to the shiftable plate 42 already described. In this manner, simultaneous with operation of the brakes associated with the several bull wheels, a braking action occurs upon the disc 34 secured to the shaft 58 with a resulting restraint against turning of the two flanged wheels 56 secured thereto. Thus turning of the reel R resting upon these two flanged wheels 56 is also retarded and the cable maintained in a taut condition between that reel and the bull wheel.

Referring now to either Fig. 2 or Fig. 8, the fore end of the apparatus is to the left, this being the direction in which the cables C1, C2 and C3 are strung toward the nearest or first power pole or transmission tower. The cable C1 is coiled on the drum of the reel R1 on the foremost cradle or reel support 55. The cable C1 extends tangently from the lowermost side of the coil on the drum of reel R1 into tangent engagement with the lowermost side of the lower bull wheel 22 around the aft side of the latter and up and over the upper bull wheel 21. As illustrated in Fig. 4 the cable C1 is trained around the right hand bull wheels 21R—22R these being schematically illustrated in Fig. 6 and in elevation Fig. 5. It should here be noted that the cable extending from any one of the reels passes between a pair of guide rollers 63 disposed as near as possible to a line L extended from a transverse center of the particular reel, i.e., a line L struck substantially between the end walls W of the reel from or to which the cable extends. In addition to the foregoing it should be noted that the reels are supported at such a distance from their associated guide rollers as to minimize the angular disposition of the cable relative to the imaginary center line L between the end walls W of the reel. This is to minimize surface contact of the cable as it pays out from the reel or during winding in of the cable relative to the reel.

Referring again to cable C1 it will be noted that the guide rollers 63 therefor are disposed to align the cable C1 with the innermost sheave groove 64 on the lowermost bull wheel 22R. It should also be noted that the innermost sheave groove 65 on the uppermost bull wheel 21R is offset relative to sheave groove 64 and more particularly that groove 65 is offset halfway between the first and second sheave grooves 64 and 64′ respectively, of the lowermost bull wheel 22R. In this manner the cable C1 takes a spiral-like path as it winds about the lower and upper bull wheels 22R—21R. This minimizes relative movement between the cable and the walls of the grooves 64—65 of the bull wheels. In other words as the cable moves axially in a helical path about the bull wheels, the bull wheels themselves turn unidirectionally with the cable so that there is no relative movement between the cable and the sheave groove walls.

In the present disclosure I have shown the cable as being wound about the bull wheels at least four turns. In other words, the bull wheels 21R—22R each have five sheave grooves, groove 64 on wheel 22R being the entrance groove and groove 65′ on the uppermost bull wheel 21R being the last or exit groove of the tensioning device. As the cable leaves the tensioning device it extends between a pair of guide rollers 66 so disposed as to keep the cable in direct alignment with the exit groove 65′. From there on the cable extends up to the cross arm on the first power pole or transmission tower where it rides over some wooden rollers temporarily used during stringing of the cable from pole to pole.

The foregoing explanation as to the stringing of the cable C1 is equally applicable to the stringing of the cable C2 with only a slight difference. The cable C2 comes from the reel R2 which is rollably supported on the cradle mounting 55 at the aft end (right hand Figs. 2 or 10) of the apparatus. The bull wheels 21L and 22L are employed and the cable C2 extends tangentially from the upper side of the reel R2 toward the upper round of the upper bull wheel 21L. Here too the cable is guided between a pair of guide rollers 63' suitably supported on the framework 11 substantially midway between the sides thereof for the same reasons as explained in connection with the cable C1. As illustrated in Fig. 7, the cable C2 is guided by the rollers 63' into the first (innermost) groove 67 on the upper bull wheel 21L. Thence down to the inner groove on the lower bull wheel 22L and so on spirally around these two bull wheels exiting from the outermost groove 67' of upper bull wheel 21L tangently forwardly between guide rollers 68 and on up to the cross arm of the first power pole or transmission tower.

As shown in Figs. 2 and 4 the guide rollers 63, 66, 63' and 68 are all suitably supported on the framework 11 in a manner to maintain the respective cable extending between them in alignment with the particular entrance or exit grooves on the bull wheel.

The arrangement is such that the number of turns of cable around each set of bull wheels is determined by the surface engagement between the cable and sheave groove walls to assure a positive contact between them and to assure against slippage of the cable relative to the bull wheels. Thus it will be seen that by proper manipulation of the brake mechanism 32 or the direct drive 33 the cables can be properly tensed relative to the power poles over which they are being strung in the manner hereinbefore explained. In this manner the cables can be kept from sagging to a point of touching the ground and marring or scratching of the cables thus avoided.

In addition to the foregoing, since the reels R1 and R2 are restrained against turning with braking pressure or drag coordinated with the braking mechanism, the strand of cable between the reels R1—R2 and their respective sets of bull wheels is kept taut and will not sag into contact with parts of the framework 11 or the trailer bed upon which the latter is mounted.

With the arrangement illustrated in Figs. 8 to 11 the height of the trunnion tower 20' is kept at a minimum, say to approximately the height to which the upper extremities of the reels R1 and R2. However, in addition to the foregoing advantage the diagonal disposition of the tensioning device B on the leaning trunnion tower 20' it will be noted that the lowermost bull wheel 22 is disposed at a greater distance from the reel R1 than is the bull wheel 21. By the same token the upper bull wheel 21 is a greater distance from the reel R2 than is the lower bull wheel 22. By this arrangement the length of cable C1 or C2 between the respective bull wheel 22 or 21 is as long as possible within the limits afforded by the size of the apparatus. The reason for this feature is based upon the premise that the greater the distance between the bull wheel and the reel from which the cable extends to that bull wheel, the lesser is the angle (see Figs. 4 and 9) of that length of cable relative to the long axis of the apparatus. This minimizes scratching or marring of the surface of the cable as it pays out from the reel or vice versa and thus helps to alleviate corona loss which is the major problem and purpose.

There is another advantage attributable to the forward lean of the type of trunnion tower 20' illustrated in Figs. 8 through 10. This is best realized when the apparatus 10' is used for reclaiming, i.e., winding in cable which had previously been in use in a power line. This operation of winding in the cable is best explained in connection with Fig. 10 wherein the cable C travels, for purposes of this explanation, in an opposite direction to that previously explained and the entire operation is in reverse. Thus it will be seen that when the cable is taken in it is threaded between the upper guide rollers 68 entering the tensioning device T on a tangent with respect to the upper bull wheel 21 which is supported in advance of the lower bull wheel 22. The cable enters the upper bull wheel 21 at its outermost sheave groove 65' (heretofore referred to as the exit groove) which now becomes the entrance groove.

The cable is trained around the bull wheels 21—22 the number of times necessary to obtain the traction required to pull in the cable (four times in the illustration). The cable ultimately exits from the innermost sheave groove 67 (heretofore referred to as the entrance groove) and thence between guide rollers 63' and over to the drum D of the reel R to which it is secured.

With the cable strung around the tensioning device B as above explained, the source of power P is started and by way of the direct drive 33 the bull wheels 21 and 22 are positively turned. In this manner the cable C is drawn in by its tractional contact in the several sheave grooves in the bull wheels. Reel R is then turned in direct relation with the bull wheels so that the strand of cable between the exit bull wheel and the cable will not sag but will be drawn onto the drum D. The workmen can control the cable coming onto the reel R and guide it for spiral winding upon the drum D so that all of the incoming cable can be reclaimed for reuse elsewhere.

While I have illustrated and described a preferred embodiment of the present invention, it will be understood, however, that various changes and modifications may be made in the details thereof without departing from the spirit and scope of the invention as set forth in the appended claims.

Having thus described the invention, what I claim as new and desire to protect by Letters Patent is defined in the following claims:

1. A tensioning device for transmission cable comprising a trunnion tower, a pair of shafts supported in spaced parallel relation on said trunnion tower, a sheaved bull wheel journaled on the upper one of said shafts, a sheaved bull wheel on the lower one of said shafts, the sheave grooves of said lower bull wheel being offset one half sheave groove relative to the sheave grooves on the upper one of said bull wheels whereby said cable strung around said upper and lower bull wheels follows a spiral path during turning of said bull wheels, and means for restraining turning of said bull wheels relative to said trunnion tower for tensioning the strand of cable as it is pulled therefrom comprising a sleeve shaft on each of said pair of shafts and secured to the bull wheel thereon for turning therewith, a brake disc flange on each said sleeve shaft in spaced relation to the bull wheel thereon, a pair of brake shoes embracing said brake disc, means supporting said brake shoes adjacent said brake disc for concerted movement toward and from the latter, and manually operated means connected to said brake shoes for optionally moving the latter into frictional contact with said brake disc.

2. A tensioning device for transmission cable comprising a trunnion tower, a pair of shafts supported in spaced parallel relation on said trunnion tower, a sheaved bull wheel journaled on the upper one of said shafts, a sheaved bull wheel on the lower one of said shafts, the sheave grooves of said lower bull wheel being offset one-half sheave groove relation to the sheave grooves on the upper one of said bull wheels whereby said cable strung around said upper and lower bull wheels follows a spiral path during turning of said bull wheels, and a means for exerting a drag on each of said bull wheels comprising a brake disc secured thereto for turning movement therewith, a pair of brake shoes carried by said trunnion tower, said brake shoes embracing said brake disc and normally spring urged into non-bearing relation therewith, and a manually controlled lever for urging said brake shoes into frictional contact with said brake disc by degrees for counteracting turning of said bull wheel under the influence of a pull exerted on said cable engaging the same.

3. An apparatus for stringing transmission cable from reels upon which it is wound to transmission towers over which one end of such cable is pulled, comprising a mobile framework adapted to be anchored relative to one of said transmission towers, a reel support at each end of said framework, a tensioning device comprising a trunnion tower on said framework between said reel supports, a pair of shafts mounted on said trunnion tower transversely thereof and in spaced relation with respect to each other, a bull wheel journaled on each of said shafts, each said bull wheel having a plurality of sheave grooves for receiving a strand of said cable wound around said bull wheel to frictionally engage the latter, and a brake mechanism operatively associated with each said bull wheel for maintaining said cable in a taut condition comprising a brake disc connected coaxially of each said bull wheel, a pair of brake shoes on said framework embracing said brake disc, means normally holding said brake shoes in spaced relation to said brake disc, and manually operated means connected to said brake shoes for urging the latter against said brake disc.

4. An apparatus for stringing transmission cable from reels upon which it is wound to transmission towers over which one end of such cable is pulled, comprising a mobile framework adapted to be anchored relative to one of said transmission towers, a reel support at each end of said framework, a tensioning device comprising a trunnion tower on said framework between said reel supports, a pair of shafts mounted on said trunnion tower transversely thereof and in spaced relation with respect to each other, a bull wheel journaled on each of said shafts, each said bull wheel having a plurality of sheave grooves for receiving a strand of said cable wound around said bull wheel to frictionally engage the latter, and a brake mechanism operatively associated with each said bull wheel for maintaining said cable in a taut condition, each comprising a brake disc on said transverse shaft and secured to an adjacent bull wheel for turning therewith, a bracket secured to said framework adjacent said brake disc, a pair of brake shoes embracing said brake disc and pivotally supported on said bracket for movement toward and from said brake disc, and manually operated means connected to said brake shoes for urging the latter toward said brake disc.

5. In an apparatus for paying out transmission cable relative to transmission towers over which one end of said cable is pulled and mounted on a framework adapted to be anchored adjacent one of said transmission towers, a pair of bull wheels journaled on said framework having said cable wound about them to afford a frictional drag to said cable, and a reel support adjacent said bull wheels, a shaft journaled transverse to said cable on said framework, a flanged roller secured to said shaft for frictionally engaging one of the end walls of said cable reel for turning thereby, and drag means operatively associated with said transverse shaft comprising a brake disc secured to said transverse shaft, a pair of brake shoes supported on said framework and embracing said brake disc, and manually operated means connected to said brake shoes for urging the latter into frictional engagement with said brake disc for maintaining the cable extending from said bull wheels to said cable reel in a taut condition.

6. In an apparatus for paying out transmission cable relative to transmission towers over which one end of said cable is pulled, a framework adapted to be anchored adjacent one of said transmission towers from which said cable extends, a cradle at each end of said framework for supporting a cable reel having spaced end walls each provided with a peripheral edge, each said cradle comprising a pair of spaced parallel shafts each journaled transverse to said cable on said framework, and means for tensioning a cable being strung comprising a trunnion tower midway the ends of said framework, a set of upper and lower bull wheels journaled on said trunnion tower each including a plurality of sheave grooves, the sheave grooves on the upper bull wheels being offset relative to the sheave grooves on the lower bull wheels whereby to receive a strand of cable wound around said upper and lower bull wheels in spiral fashion, a drag means operatively associated with each of said bull wheels, and brake means operatively associated with at least one of said transverse shafts of each said cradle comprising a brake disc secured to said one transverse shaft, a pair of brake shoes supported on said framework and embracing said brake disc, and manually operated means connected to said brake shoes for urging the latter into frictional engagement with said brake disc for maintaining the cable taut between the reel supported on said cradle and each set of said upper and lower bull wheels.

7. A tensioning device for stringing transmission cable over several spans of power poles comprising upper and lower bull wheels journaled for turning movement about fixed beam shafts parallel to and spaced from each other, each said bull wheel including a plurality of peripheral sheave grooves calculated to receive a strand of said cable for surface contact therewith and formed integrally with a hub like bearing spanning the full width of said bull wheel for bearing relation with the fixed shaft upon which it is mounted, and brake means operatively associated with each of said bull wheels each comprising a pair of manually operated brake shoes, and a brake disc embraced by said brake shoes formed integrally with and co-axially of said hub like bearing for turning therewith relative to the fixed shaft supporting the same.

8. In apparatus for stringing transmission cable from reels upon which it is coiled to transmission towers over which one end of said cable is pulled, a tensioning device comprising a framework anchored relative to one of said transmission towers, a trunnion tower midway between the fore and aft ends of said framework and including a pair of transverse shafts fixedly secured to said trunnion tower one above the other, a pair of upper and lower bull wheels having their hub portions journaled upon said pair of transverse shafts for turning relative thereto, each said bull wheel having a plurality of sheave grooves adapted to wedgingly receive said cable for grippingly engaging the same, the sheave grooves on one of said bull wheels being offset one-half a sheave width relative to the sheave grooves on the other one of said bull wheels, means for guiding said cable extending from one of said reels to the innermost one of the sheave grooves on one of said bull wheels, means for guiding said cable relative to the outermost one of said sheave grooves and said transmission tower over which said cable is being strung, and brake means for each of said bull wheels for maintaining said cable thereon in a taut condition comprising a brake disc formed integrally with the hub portion of each said bull wheel, and a pair of brake shoes and operating mechanism therefor supported on said framework.

9. In apparatus for stringing transmission cable from reels upon which it is coiled to transmission towers over which one end of said cable is pulled and mounted on a mobile framework anchored relative to one of said transmission towers; a tensioning device comprising a trunnion tower midway between the fore and aft ends of said framework and including a pair of transverse shafts fixedly secured to said trunnion tower one above the other, a set of upper bull wheels journaled upon the upper one of said transverse shafts, a set of lower bull wheels journaled upon the lower one of said transverse shafts, each said bull wheel having a plurality of sheave grooves adapted to wedgingly receive said cable for grippingly engaging the same, sheave grooves on the one set of said bull wheels being offset one-half a sheave width relative to the sheave grooves on the other set of said bull wheels so that the cable winds substantially spirally about each set of upper and lower bull wheels, means for guiding said cable extending from one of said reels to the innermost one of the sheave grooves on one set of said bull wheels, means for guiding said cable relative to the outermost one of said sheave grooves on said one set of said bull wheels and said transmission tower over which said cable is being strung, and brake means operatively associated with each of said bull wheels comprising a brake disc connected co-axially of each said bull wheel, a pair of brake shoes on said framework embracing said brake disc, means normally holding said brake shoes in spaced relation to said brake disc, and manually operated means connected to said brake shoes for urging the latter against said brake disc.

References Cited in the file of this patent

UNITED STATES PATENTS

| | | |
|---|---|---|
| 519,619 | Reynolds et al. | May 8, 1894 |
| 1,661,275 | Stensland | Mar. 6, 1928 |
| 1,743,501 | Swortzel | Jan. 14, 1930 |
| 2,039,250 | Junge | Apr. 28, 1936 |
| 2,647,699 | Bush | Aug. 4, 1953 |
| 2,677,870 | Furst | May 11, 1954 |

FOREIGN PATENTS

| | | |
|---|---|---|
| 456,070 | France | June 9, 1913 |
| 832,058 | Germany | Feb. 21, 1952 |